(No Model.)
F. T. BUSSE.
DEVICE FOR REMOVING FEATHERS FROM FOWLS.
No. 554,050. Patented Feb. 4, 1896.
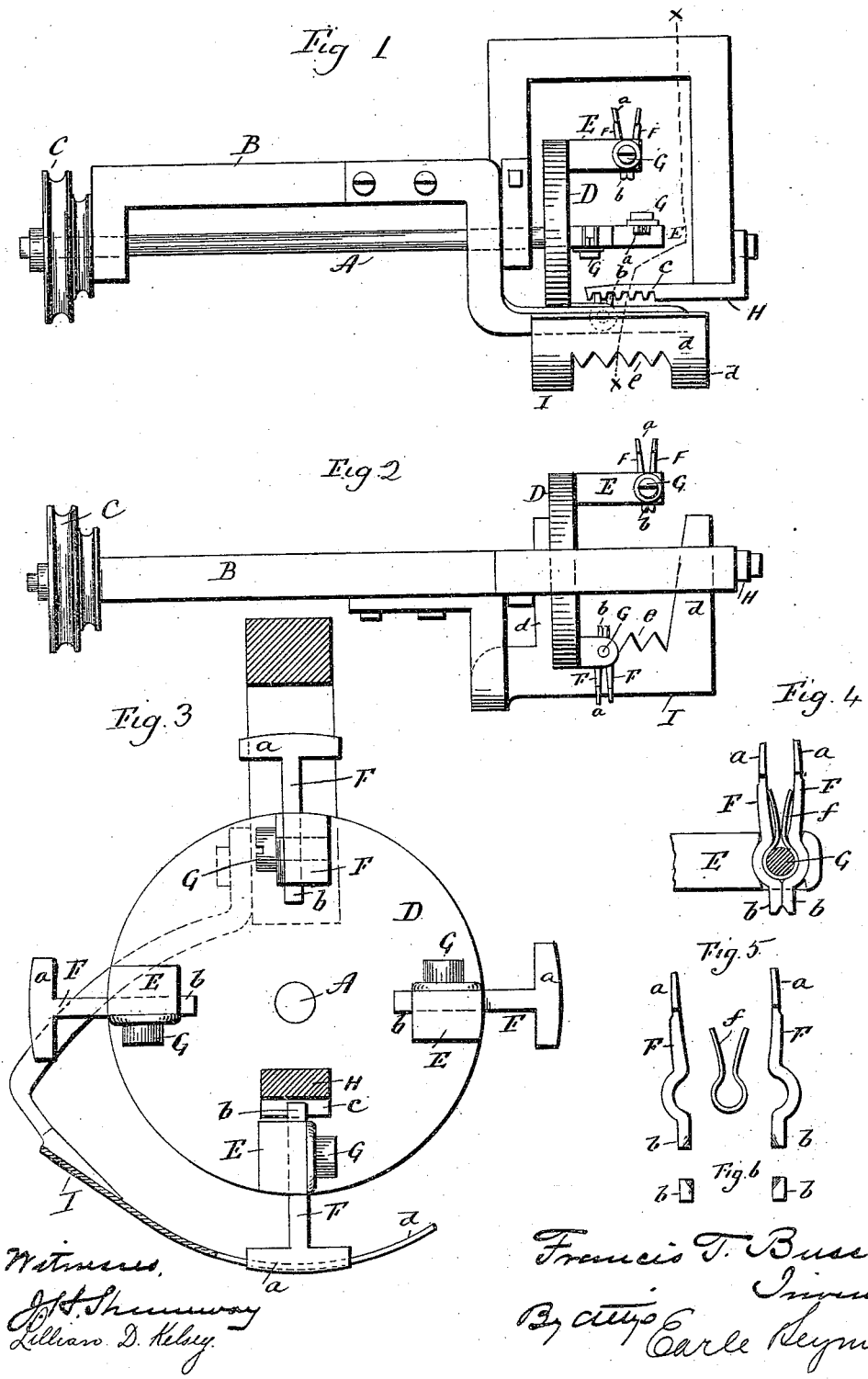

UNITED STATES PATENT OFFICE.

FRANCIS T. BUSSE, OF WALLINGFORD, CONNECTICUT.

DEVICE FOR REMOVING FEATHERS FROM FOWLS.

SPECIFICATION forming part of Letters Patent No. 554,050, dated February 4, 1896.

Application filed November 18, 1895. Serial No. 569,288. (No model.)

*To all whom it may concern:*

Be it known that I, FRANCIS T. BUSSE, of East Wallingford, in the county of New Haven and State of Connecticut, have invented a new Improvement in Devices for Removing Feathers from Fowls; and I do hereby declare the following, when taken in connection with the accompanying drawings and the letters of reference marked thereon, to be a full, clear, and exact description of the same, and which said drawings constitute part of this specification, and represent, in—

Figure 1, a side view; Fig. 2, a top view; Fig. 3, a section on line $x\ x$ of Fig. 1; Fig. 4, a side view of one of the arms with the grippers mounted thereon enlarged; Fig. 5, a side view of the grippers and spring detached; Fig. 6, an end view of the gripper-arms.

This invention relates to an improvement in devices for picking poultry, the object being to produce a device which will operate similar to the human hand—that is, grasp the feathers, draw them from the fowl, and release them—and it consists in the arrangement and combination of parts, as will be hereinafter described, and particularly recited in the claims.

A shaft A is mounted in a frame B and provided at its outer end with pulleys C. To the inner end of the shaft a head D is attached, from which arms E, more or less in number, (here shown as four,) project outward parallel with the shaft and of different lengths. In each arm a pair of grippers F F are mounted upon a pivot G, each gripper comprising a finger $a$, which extends radially outward, and short arms $b$, which extend radially inward, and between each pair a spring $f$ is arranged, the tendency of which is to force the fingers apart. The end of the frame extends upward, outward, and downward around the head D, and at its lower end carries a bar H, which projects inward toward the head. The under side of the bar is formed with cam-teeth $c$, in position to separate the arms $a$ of the grippers, the edges of the said arms being beveled or rounded for this purpose. Beneath the head and bar H is a curved guard I, mounted on the frame, so as to stand in a plane parallel with the path of movement of the grippers. This guard consists of two arms $d\ d$, between which is arranged a series of teeth $e$. As the head is revolved the arms $b$ of the grippers come in engagement with the cam-teeth $c$ on the bar H, which forces them apart, and consequently forces the fingers $a\ a$ together until the grippers pass beyond the bar, when the spring $f$ operates to open them. This frame is mounted in suitable supports, and is preferably arranged in connection with a chute and air-blast, (not shown,) by which the feathers plucked may be carried to any desired point.

The fowl to be plucked is held beneath the guard I and so that the feathers separated by the teeth $e$ extend upward between the arms $d$ and in the path of the grippers. The head D being revolved, successively presents its grippers beneath the cam-teeth $c$ on the bar H, whereby the fingers are operated, as before described, so as to grasp and withdraw one or more feathers, which, after being drawn, are released, and the next succeeding grippers operate at different points. Thus by slowly moving the fowl the feathers are rapidly plucked.

The operation of the gripping-fingers is similar to the operation of the human hand—that is, a number of feathers are grasped and drawn and then released—but with four sets of grippers and the rapidly-revolving head it will be seen that the process of plucking the fowl may be very rapid.

I claim—

1. In a device for removing feathers from fowls, the combination with the revolving head provided with outwardly-extending arms, of grippers mounted in said arms, and a rack in the path of movement of said grippers, whereby they are successively closed, substantially as described.

2. In a device for removing feathers from fowls, the combination with a revolving head, provided with outwardly-extending arms of varying lengths, of grippers mounted in the said arms, and a rack in the path of movement of the said grippers, whereby they are successively closed, substantially as described.

3. In a device for removing feathers from fowls, the combination with a revolving head provided with outwardly-extending arms, of grippers mounted in the said arms, and each consisting of a pair of outwardly-extending fingers and inwardly-extending arms, a rack in the path of movement of the arms of the said grippers, whereby they are successively opened to close the fingers, substantially as described.

4. In a device for removing feathers from fowls, comprising a revolving head with outwardly-extending arms, said arms carrying grippers, a rack in the path of said grippers, whereby the fingers are successively closed, and a guard arranged beneath said head, and in the path of movement of said grippers, substantially as described.

In testimony whereof I have signed this specification in the presence of two subscribing witnesses.

FRANCIS T. BUSSE.

Witnesses:
FRED. C. EARLE,
JOHN MAYER.